May 25, 1948.  J. W. HART  2,442,292
FORM FOR PLASTIC STRUCTURAL WORK
Filed April 24, 1944   5 Sheets-Sheet 1
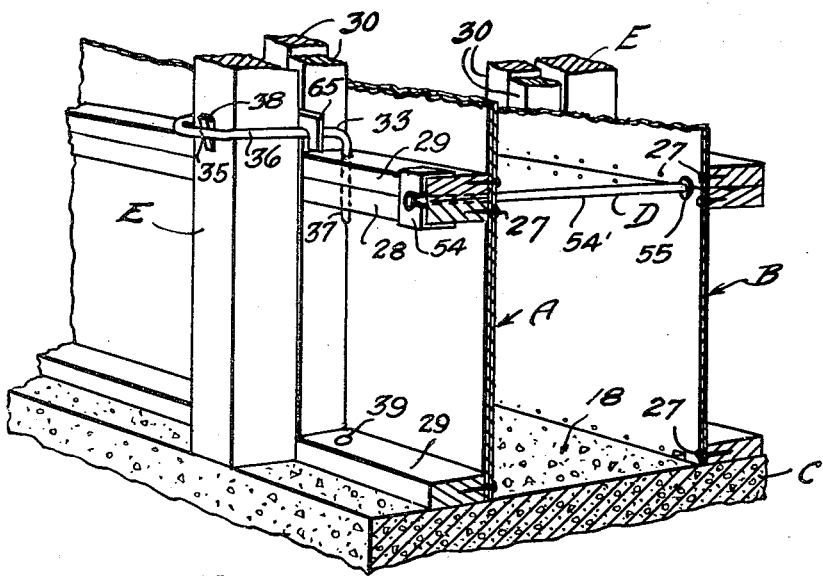
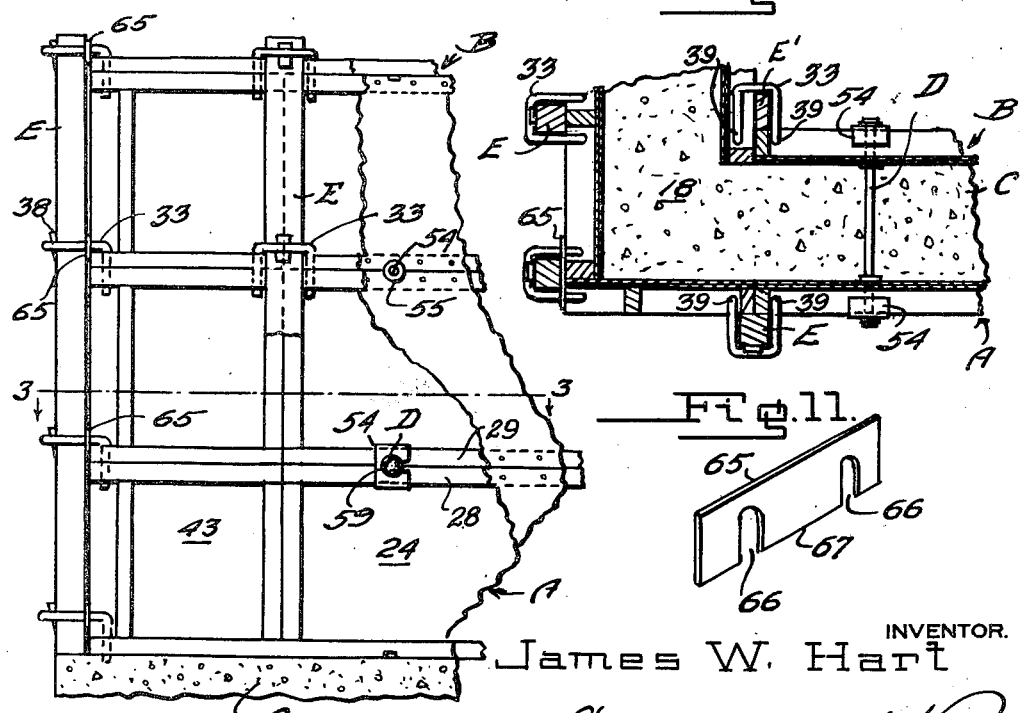
INVENTOR.
James W. Hart
BY Lancaster, Allwine Rommel
ATTORNEYS.

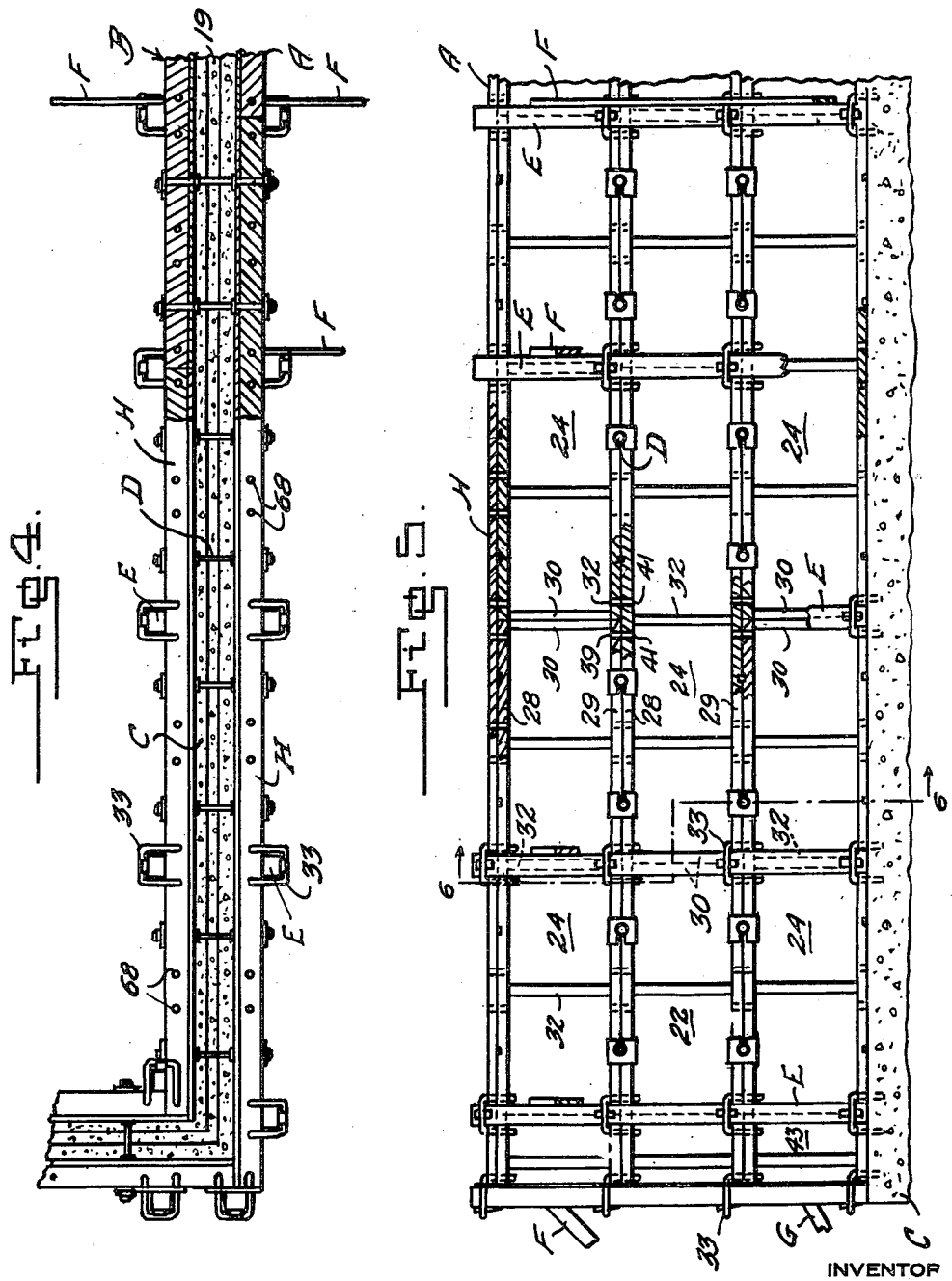

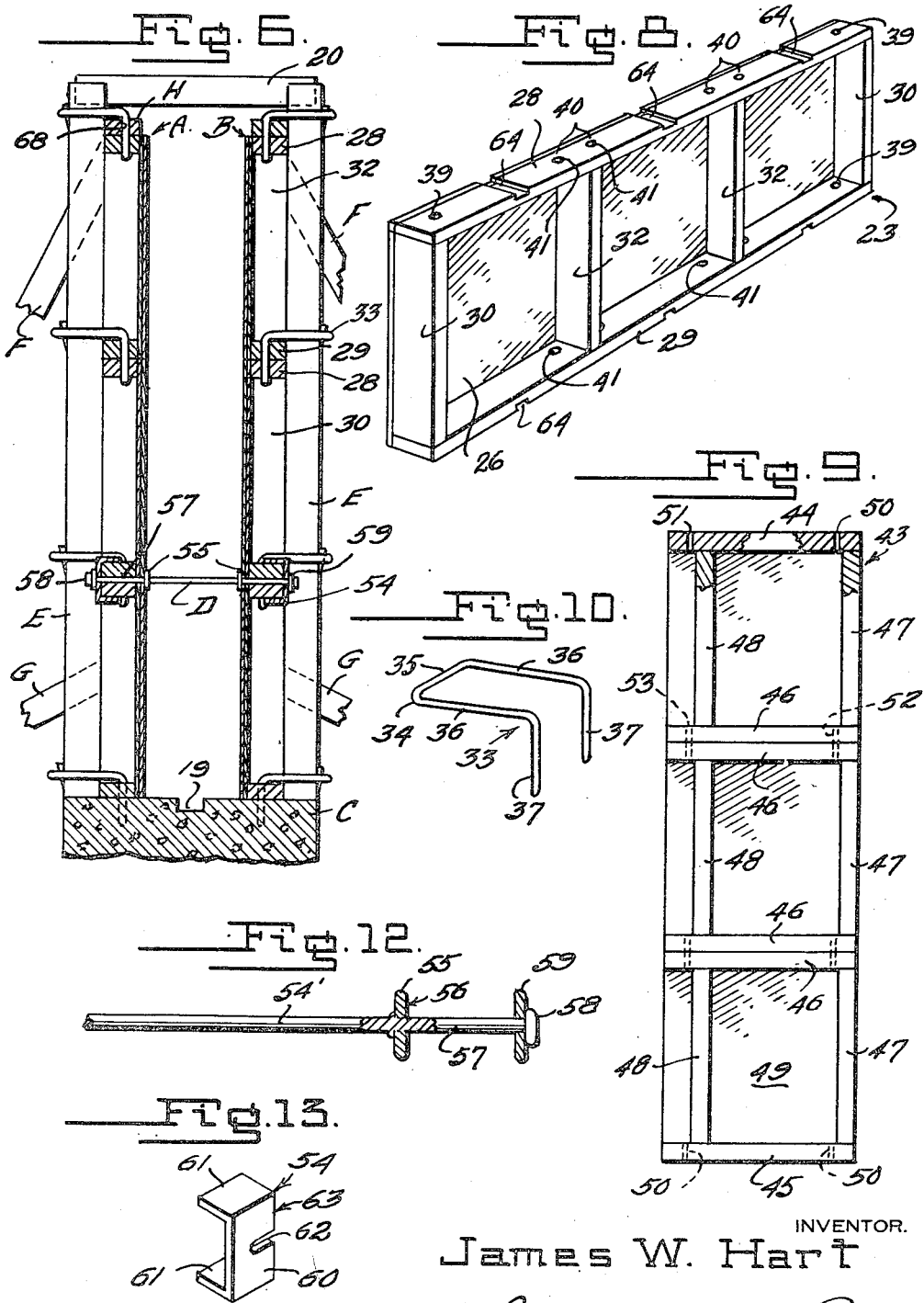

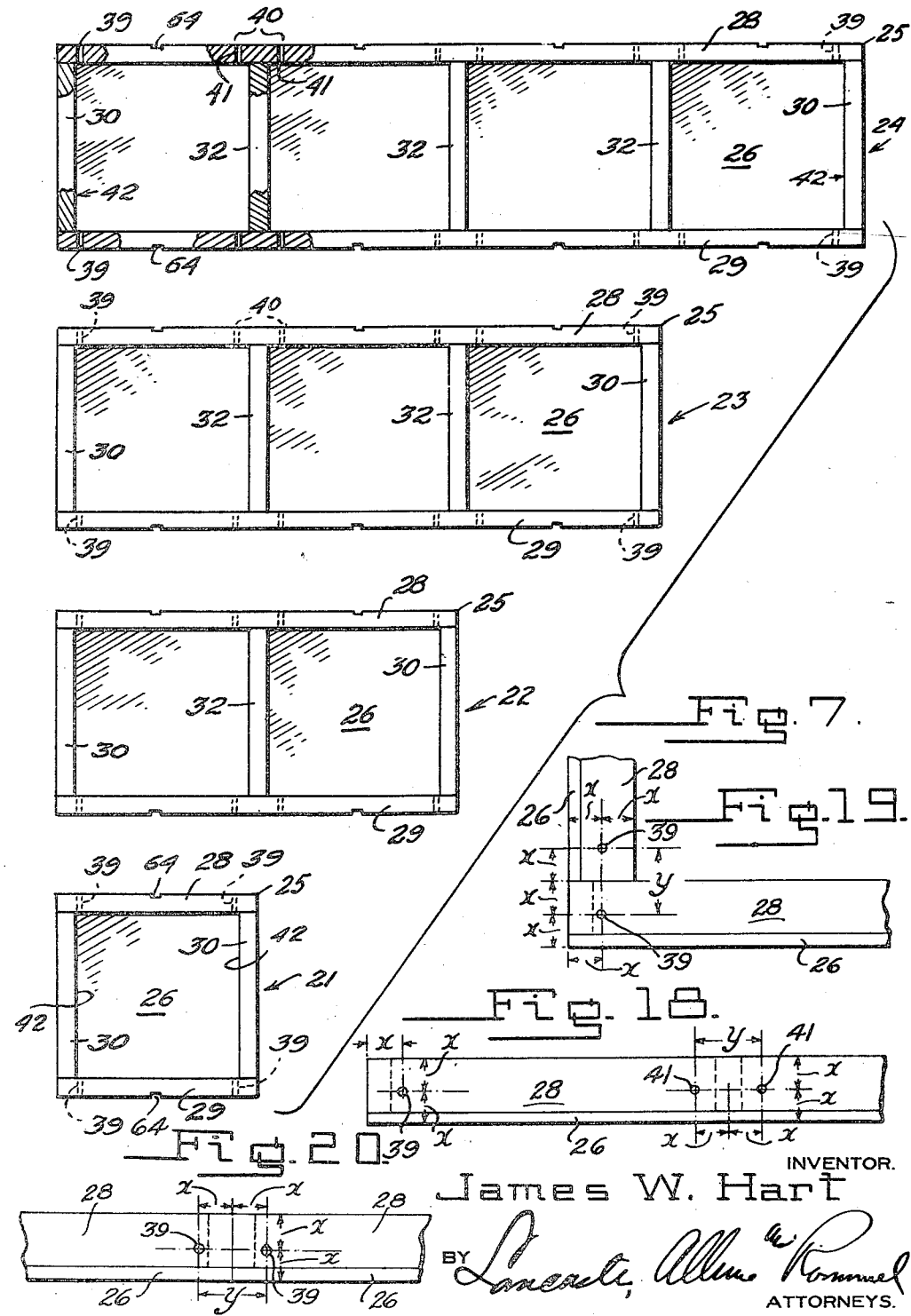

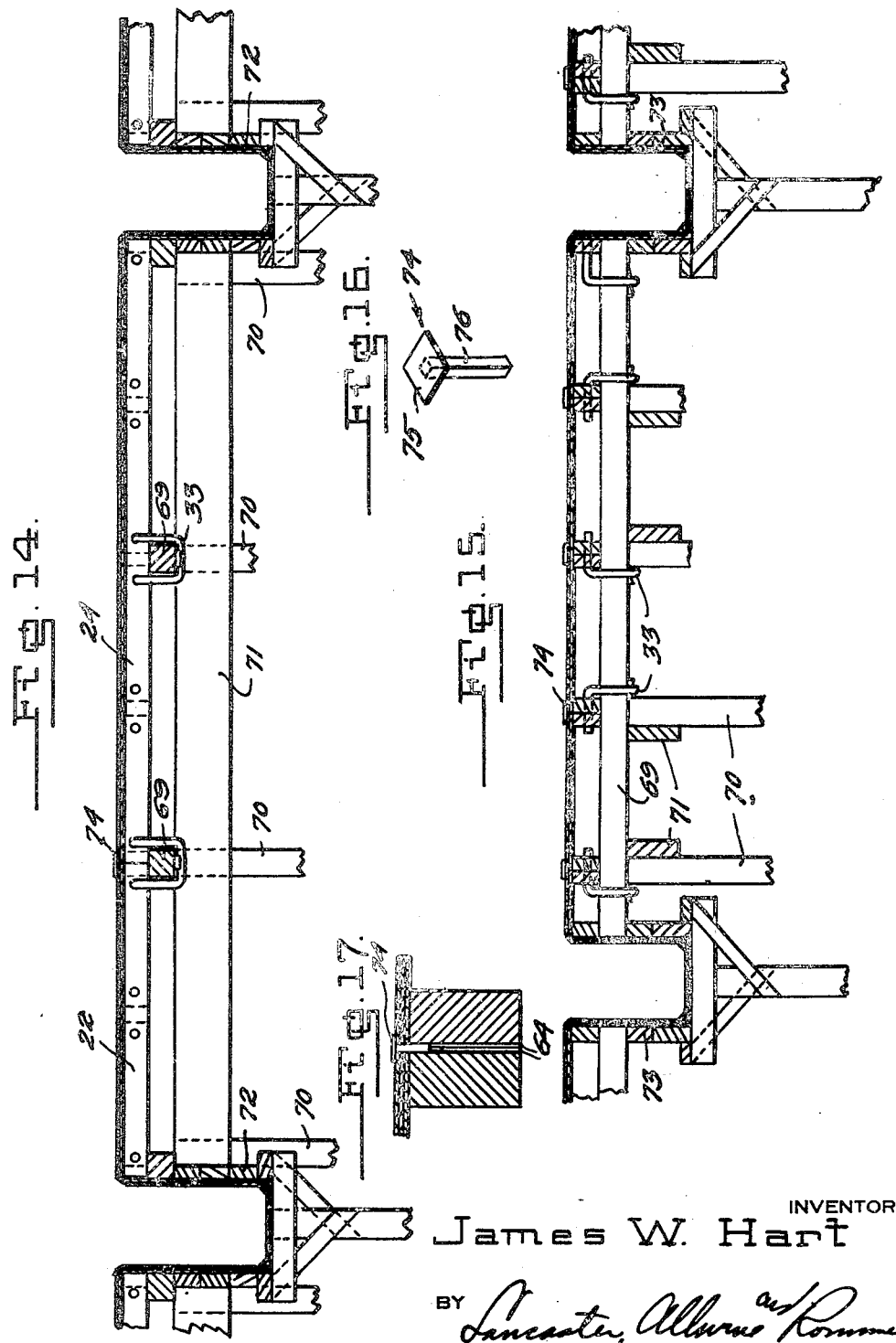

Patented May 25, 1948

2,442,292

UNITED STATES PATENT OFFICE 2,442,292

FORM FOR PLASTIC STRUCTURAL WORK

James W. Hart, Oak Ridge, Tenn., assignor, by mesne assignments, of one-half to Nicholas Del Genio, Oak Ridge, Tenn.

Application April 24, 1944, Serial No. 532,487

2 Claims. (Cl. 25—131)

The present invention relates to improvements in forms for plastic structural work. It is particularly well adapted for use in connection with monolithic concrete construction.

One of the principal objects of the invention is to provide a plurality of strengthened mold panels of predetermined sizes, from which selection may be made, according to the particular structure to be formed, and which may be quickly assembled to constitute the major portion or all of the mold, and readily dismantled without damage for reuse. The invention is particularly adapted, altho not necessarily limited, for use in the erection of foundation walls, walls above ground, retaining walls, dams, bridges, culverts, and exterior and interior walls as well as ceilings and floors of buildings.

Another object of the invention is to provide mold panels which may be fabricated from standard building construction materials, such as 2 x 4's of wood and ply-wood, readily available in most any populated locality, whereby they may be made and repaired at or near the job.

A further object of the invention is to provide mold panels and construction accessories for association therewith, which make unnecessary the use of large quantities of nails, spikes, or bolts, and make possible the erection of the mold and the dismembering of same without damaging the major portion of the material used.

Another object of the invention is to provide mold panels adapted to be held in coupled relation to one another and to bracing uprights, also of standard sizes, such as 2 x 4's and 4 x 4's of wood, susceptible of reuse, so as to avoid the expense and labor often incident to the provision of forms erected according to the particular project and with no thought of salvaging any great portion of the materials used.

Another object of the invention is to provide mold panels which may be arranged in end to end relation and in horizontal courses with staggered joints, without the necessity of selecting a particular end of one panel to abut a particular end of an adjacent panel and without the necessity of arranging a particular horizontal margin of any one panel either upon the foundation or upon a subjacent panel. In other words, the ends of any one panel are made identical and the tops and bottoms of the panel are also made identical, thus providing a panel the marginal portions of which need not be specifically and uniformly designated as "left," "right," "top" and "bottom."

Another object of the invention is to provide mold panels of uniform height, such as two feet, but ranging in length from minimum, such as two feet, to maximum, such as eight feet, the "maximum" preferably being of a size and weight that it may be conveniently carried and placed by the average workman, and the range being in multiples of the length of the panel of minimum size, such as panels of two, four, six and eight foot lengths. This permits the selection of as many panels of maximum length as possible, for use in erecting a mold wall of a given length and height, in horizontal courses with staggered joints, the panels of smaller length being used to fill in at the ends of the mold wall to produce aligned, vertical terminals at the ends of all of the courses.

Other objects and advantages of the invention will appear in the following detailed description of the preferred embodiment of the invention, taken in connection with the accompanying drawing, forming a part of this specification, and in which drawing:

Figure 1 is a fragmentary view partly in perspective and partly in vertical transverse section showing a foundation and portions of forms constructed and assembled according to the present invention.

Figure 2 is a fragmentary elevational view of the erected forms at a portion for forming a right angular corner, a portion being broken away and shown in section to disclose details.

Figure 3 is a horizontal sectional view on the line 3—3 of Figure 2.

Figure 4 is a view partly in plan and partly in horizontal section, on a reduced scale, showing the forms erected and capped in readiness for pouring of the plastic structural material.

Figure 5 is a view partly in elevation and partly in vertical section of the assembly shown in Figure 4.

Figure 6 is a transverse sectional view on the line 6—6 of Figure 5.

Figure 7 is a view in elevation looking toward the outer faces of a series of separated typical panels of stepped sizes and for comparison of their various lengths.

Figure 8 is an enlarged perspective view of one of the panels.

Figure 9 is a view in elevation looking toward the outer face of a panel construction suitable for use at outer corner of a mold intended to produce rectangular corner portion of a wall, such as the corner in Figures 4 and 5.

Figure 10 is a perspective view of a clamp member employed for the purpose of coupling adjacent mold panels together and to a vertical wale, or the intermediate portion of the panel to such wale.

Figure 11 is a perspective view of a spanner used in association with the clamp member illustrated in Figure 10, particularly when used to join two abutting mold panels.

Figure 12 is a fragmentary view partly in plan and partly in horizontal section of a portion of a tie used in connection with opposite walls of the mold.

Figure 13 is a perspective view of a combination panel clip and tensioning device for the tie.

Figure 14 is a fragmentary view partly in vertical section and partly in elevation of a form using panels of the character shown in Figure 7, in association with other mold means suitable for the production of girders and the underside of a floor or roof associated therewith.

Figure 15 is a view similar to Figure 14, but looking in a direction at right-angle thereto.

Figure 16 is a perspective view of a tie recess filler which may be used to close recesses in the mold panels when used for floor construction or wall sections where ties are not needed.

Figure 17 is a view partly in vertical section and partly in elevation showing the use of the filler disclosed in Figure 16.

Figure 18 is an enlarged fragmentary top plan view of a portion of the top panel of Fig. 7.

Figure 19 is a fragmentary view of plan of two stock panels arranged in right angular relation to one another.

Figure 20 is a fragmentary view in plan of two aligned stock panels.

The form, in the example shown, comprises an outer wall A, and an inner wall B, to provide the cavity of the mold, resting upon a foundation or footing C, the walls being held in proper spaced relation by ties D and held against movement away from one another by vertical brace members E, steaded in any suitable manner, such as by upper diagonal brace members F and lower diagonal brace members G. When the mold walls have been erected to the desired height, cap or leveling strips H may be placed at the upper portions of the walls and secured to the vertical brace members E, these caps or leveling strips serving to assure accuracy and prevent damage to the upper portions of the mold walls, which might otherwise occur during the pouring of the plastic material.

The details of the foundation or footing C forms no part of the present invention, it being obvious to those skilled in the art that the characteristics of the ground on which the structure is to be erected, and the height of the structure, as well as its weight, will determine the characteristics of the foundation or footing. A preferred characteristic of the foundation or footing is that its upper surface 18 be level, but it may be provided with a groove 19 open to its upper surface, as shown in Figs. 4 and 6, so as to more effectively bond the superjacent set plastic material thereto.

Initially the vertical brace members E are arranged on the footing C, properly spaced and braced by the diagonal members F and G in the usual manner. If desired top cross braces 20, one of which is shown in Fig. 6 may be secured to the upper ends of companion opposite vertical brace members E, altho these may be subsequently removed to facilitate pouring of the plastic material, after the mold walls have been erected and securely tied in spaced relation.

In a practical embodiment of the invention, the vertical brace members may be stock material, such as wooden 4 x 4's, readily available in most any populated section, and since very little nailing of lateral supports thereto is required, these vertical brace members may be used a number of times on different jobs. As will be subsequently brought out, no nails, spikes or bolts are required to secure the mold walls to these vertical brace members and the characteristics of the mold panels from which the mold walls are formed, permit the use of stock material, such as wooden 2 x 4's as a frame for each panel proper. In this way the mold panels may be made near, or at the job, from materials readily available, and any special panels which may be required, such as at some of the corners, can be readily made from stock material and properly aligned with the uniform panels making up the major portion of the mold wall.

The mold panel types susceptible of use in making all, or the major portion of the mold walls are shown for comparison in Fig. 7. They may each be made of a size and weight that the average workman can readily carry and place any selected panel without strain or fatigue, and without likelihood of damage to the panel even tho subjected to wind forces or rough handling. They are preferably made in sizes ranging from minimum, say 2' x 2' to maximum of say 2' x 8' and are all of uniform height. In length they are multiples of the minimum size, whereby a selection may be made for a given length of mold wall, using as many panels of maximum size as possible, and selecting panels of the lesser length to fill in at ends, and to make possible the placing of the panels in courses with staggered joints. The panels are so dimentioned that if there is not available sufficient panels of maximum length to use them as above set forth, but plenty panels of lesser length, then the latter may be used, even intermediate the end portions of the wall, without altering them either as to size or characteristics for clamping them to adjacent panels and to the vertical brace members E.

Referring more particularly to Fig. 7, I show a minimum type rectangular panel 21; a second larger rectangular elongated type panel 22, which is in length twice that of panel 21; a third larger rectangular elongated type panel 23, which is in length three times that of panel 21; and a fourth larger or maximum rectangular elongated type panel 24, which in length is four times the length of panel 21.

Each panel comprises a frame 25 and a panel proper 26, secured thereto in any suitable manner, such as by nails 27 (Fig. 1) or by an adhesive. Each frame comprises or includes spaced parallel horizontal wales 28 and 29 flush with the upper and lower margins, respectively, of its respective panel 26, and spaced, parallel, vertical stiles 30 flush with the end margins of its respective panel. It is preferred to have the wales 28 and 29 of a length greater than the stiles 30 so as to dispose the ends of the latter in abutting relation to and between the wales. The minimum type panel 21 requires no intermediate bracing, but in order to guard against outward bulging of the panels proper of the larger sizes when subjected to pressure of the plastic material in the mold, it is preferred to provide one or more upright, intermediate frame members 32, similar to the stiles 30. By making the wales 28 and 29, the stiles 30 and the intermediate frame members 32 of wooden 2 x 4's, I not only use material which is readily available, but also make possible the erection of mold walls where the vertical brace members E may be located to backup, so to speak, the joints between adjacent panels and the intermediate frame members 32, by surface to surface contact thereof with the vertical brace members. A further advantage resides in the use of inexpensive clamp members 33, which may be readily made from rod material by a blacksmith or by use of rod bending equipment, for the dual purpose of coupling the panels together and clamping them to the vertical brace members E. Where the stiles of adjacent panels are backed by the vertical brace member E, the combined thickness of the stiles 30 is substantially equal to the thickness of brace member E, so that the clamp members may be made to embrace, with only slight play, both the brace member E and adjoining panel stiles. If an intermediate frame member 32 is backed by a vertical brace member E, then the clamp 33 may also embrace the latter as well as the frame member 32.

Each clamp member 33 includes a U-shaped body portion 34, the bight portion 35 of which, in use, is disposed in confronting relation to the outer face of the vertical brace member E and its arms 36 disposed to each side of the latter and such panel frame portion as may be in contact with or adjacent the inner face of the vertical brace member E. Each clamp member 33 also includes spaced, parallel coupling pins 37, one for each arm 36, integral with and in rectangular relation to the free end portion thereof. Each pin 37 is of a length to go thru two contacting wales of superposed panels, and each arm 36 is of a length to extend from the plane of the outer face of the vertical brace member E, along a side of such member, and to a point midway of the thickness of the mold panel where its respective pin 37 enters holes in the wales, as subsequently described. I prefer to associate with each clamp member 33, a wedge 38 which may be driven between the bight portion 35 thereof and the associated brace member E.

Each mold panel is provided with four coupling holes 39, and the maximum type panel 24 as well as the intermediate types of panels 22 and 23 are provided with pairs 40 of clamp holes 41. All of these holes must be accurately located, so that when the panels are arranged in courses, with joints in staggered relation, there will be available aligned holes for the pins 37 of clamps 33. The holes 39 must also be accurately located to facilitate joining panels at corners, as shown in Figs. 3 and 4 by use of the same clamps 33 that are used along the faces of the form walls.

To accomplish this I locate the vertical coupling holes 39 in the wales 28 and 29 adjacent the inner margins 42 of the stiles 30, each hole 39 having its axis centered a distance $x$ as shown in Figures 19, 20 and 21, midway of the combined transverse thickness of the wale and panel, and located a distance $x$ as shown in Figures 19, 20 and 21, from the adjacent end of its respective wale, equal to such centering distance. By way of example, if the transverse thickness of the wale is three and three quarters of an inch, and the thickness of the ply-wood is three quarters of an inch, making the over all thickness of the mold panel, four and one-half inches then the axis of each hole is located a distance $x$ equal to two and one-quarter inches from either face of the panel, and a distance $x$ equal to two and one-quarter inches from the adjacent end of the wale.

Thus when the mold panels are in end to end abutting relation, the coupling holes 39 near adjacent stiles 30 thereof are spaced apart a distance $y$ equal to twice the distance $x$ as shown in Fig. 20, in readiness to receive the pins 37 of the clamp member 33, and if the mold panels are arranged in right angular relation, as shown in Figure 19, as for an inside corner form, they are also spaced apart the same distance $y$ in readiness to receive the pins 37 of the same size clamp member 33 and a two-by-four inch vertical brace E' instead of a four-by-four inch vertical brace may be used, as shown in Fig. 3.

The holes 41 of each pair 40 are likewise located so that their axes are spaced apart a distance $y$ in Figure 18, longitudinally of the wale equal to the combined transverse thickness of the wale and ply-wood panel, and are located in a plane common to the axis of holes 39. To carry out the object of staggering the joints of the courses of mold panels, these pairs of holes must be accurately located with respect to the longitudinal dimension of the panels requiring them, such as panel types 22, 23 and 24, so as to have holes 41 available, aligned with holes 39 adjacent the vertical brace members E, as shown in Fig. 5, for reception of the clamp pins 37. With this end in view I locate each pair 40 of holes 41 with its transverse madial line a distance from either end of the wale, equal to the length of the minimum type mold panel 21, as in panel type 22. Where there are more than one pair 40 of holes 41 to a wale, then each pair has its transverse medial line spaced a distance from the end of the wale or the medial line of an adjacent pair equal to the length of the minimum type mold panel 21. The panel types 23 and 24 are examples and Fig. 7, shows this relationship and from it one may observe how the holes 39 and 41 may be made to align if the panel types are disposed in juxtaposed relation.

It is also preferred to locate the intermediate vertical frame members 32 so that their longitudinal axes intersect the transverse medial lines of the pairs 40 of holes 41 as shown in Fig. 7. By so doing one of these frame members 32 may be located to the rear of the vertical brace member E, where there are abutting stiles of mold panels in the subjacent or superjacent course also behind the same vertical brace member as shown in Fig. 5.

In Figs. 2, 3, 5 and 9 I show a special end mold panel 43 for the outside corner of wall A. This panel may be made at or near the job of stock materials readily available and if of course needed only where the job calls for a structure having portions in angular relation to one another, or for forming the end of the mold. It may be made of any suitable height and width, according to requirements and to permit of easy handling by workmen. It comprises an upper wale 44, a lower wale 45, intermediate wales 46, end stiles 47, offset stiles 48 and a panel proper 49 which may be continuous from the lower wale to the upper wale. Since it is preferred to make this end mold panel of a height equal to a plurality of courses of the panels used in erecting the major portion of the wall, the wales 45 and 46 are made to horizontally align with the upper and lower wales of such courses, and the intermediate wales 46 are made to align with other wales of the courses, so as to permit of use of the same clamp members 33, an example of which is shown in Fig. 10. The upper and lower wales 45 and 46 are provided with coupling holes 50, adjacent the stiles 47 and are spaced from the faces of the panels and the end of the wale, a distance like that described in connection with the coupling holes 39. Adjacent the offset stiles 48, coupling holes 51 are similarly located. The intermediate wales 46 are also provided with coupling holes 52 adjacent the end stiles 47 and axially aligned with the coupling holes 50, and at the opposite ends of these intermediate wales, are coupling holes 53 adjacent the offset stiles, these holes 53 axially aligning with the coupling holes 51. The stiles 48 are offset from the margin of the panel, as shown in Fig. 9 so they will not interfere with the arm 36 and pin 37 of the coupling member 33, as shown more particularly in Fig. 2.

While any suitable ties D may be used to properly space the mold walls A and B, I prefer to utilize ties of the character shown in the drawings, and associate with them combined panel clips and tensioning devices 54, one of which is shown in detail in Fig. 13. Each tie comprises a body portion or rod 54', provided with spacing washers or stops 55, rigid therewith and located intermediate the ends of the rod so that their outer faces 56 are spaced a distance equal to the desired width of the cavity between the mold walls, leaving extensions 57 beyond the washers at opposite ends of the rods, the rod ends being upset as indicated at 58, to confine movable washers 59 on the extensions 57, each to a zone between its respective upset end 58 and adjacent spacing washer 55.

The combination panel clip and tensioning device 54 is of channel shape, comprising a rectangular main body 60 and parallel flanges 61, spaced apart a distance equal to the vertical dimension of two wales in order that the device may clip two superposed wales together as shown in Figs. 1 and 2. The main body 60 is provided with a slot 62 open to an edge 63 thereof, to receive the extending portion 57 of the ties D with which it is associated.

In order to accommodate the extending portions 57 of the ties D, the mold panels are provided with transverse grooves 64 open to the outer faces of the wales. Each groove may be of a depth equal to one-half the diameter of rod 54 and of a width equal to the diameter of said rod, so that when two mold panels are in superposed relation the groove or grooves 64 of a subjacent panel will align with the groove or grooves 64 of a superjacent panel.

The manner of use of the ties D, and of the combined panel clips and tensioning devices 54 is perhaps evident from the foregoing description, however, it may be stated that the ties may be placed as the courses of mold panels are erected and the devices 54 moved or driven into place and bracing the wales and coursing the movable washer 59 into intimate contact with the upset ends 58.

In Fig. 11 is shown a spanner 65 for association with selected clamp members 33. The spanner is particularly useful at corners, as shown in Fig. 2 and at the joints between mold panels in courses, as shown in Fig. 1, altho the spanners may be used wherever a clamp member is placed. The spanner may consist of a strip of metal provided with spaced slot 66 open to the lower margin 67 of the strip. The centers of these slots are a distance apart equal to the spacing of the arms 36 of the clamp device 33. These spanners serve to prevent the arms 36 from spreading.

Given the dimensions of a proposed plastic structure, a person skilled in the art, may determine the number of maximum type panels 24 that may be utilized, and the number of smaller type panels that may be necessary in order to erect the major portion of each wall A and B in courses with staggered joints and to avoid the necessity of making a great number of special panels, such as is shown in Fig. 9. To start a wall on the footing C, one of the maximum type panels 24 may first be placed thereon, as shown in Fig. 5 near the lower left corner and in association with it another panel of the same type may be placed in the same course, and so on until the end of the first course is reached. If this assembly falls short of completing the first course, then it may be found that one of the shorter panels may be utilized to complete the course. If not a special panel may be made from stock material. When erecting the next course, a selection is made of one of the shorter panels to be disposed upon the initially placed panel. By way of example a selection has been made in Fig. 5 of a panel type 22 for the initial panel of the second course. From then on in completing this second course and any superjacent courses as many panels of the maximum type may be used to save time and labor and carry out the object of having the joints staggered.

It is preferred to space most of the vertical brace members E on centers, a distance equal to the length of panel type 22, so that there is a vertical brace member E, backing-up every other stile of each panel, altho the spacing of the vertical brace members E will be governed somewhat by the characteristics of the plastic structure to be erected.

The cap or leveling strips H may be made relatively long and provided with vertical holes 68 in pairs, spaced similarly to the spacing of the pairs 40 of holes 41 so as to permit of use of the same type of clamp members 33 as are used in courses below.

In Figs. 14 and 15 I show the manner in which the mold panels may be used in molding ceilings and in floor and roof construction. In Fig. 14 panels of the types 22 and 24 are shown resting upon wales 69 supported on posts or stouts 70, the latter being steadied by ledgers 71. Fig. 15 shows the manner in which several parallel series of mold panels may be used to form the major portion of the floor or roof slab between girder forms 72 and beam forms 73 which may be made and supported in the well known manner.

In Fig. 16 I disclose a tie recess filler 74, comprising a plate 75 to which is secured a plug 76 of cross-sectional dimensions such as to substantially fill the companion transverse grooves 64 in the wales of the panels, as shown in Fig. 17. These fillers 74 may be utilized to prevent gravity flow of plastic material from the mold when no ties occupy the grooves, such as in floor and roof construction, or in wall construction which may not require ties at each interval where the grooves 64 are provided in the mold panels.

The invention provides a form system for plastic structural work including mold panel types which may be put to many uses, and capable of being erected and dismantled very rapidly. A great saving results from the reuse of the panels on an indefinite number of projects.

Changes in details of the units, the arrangement of construction accessories, and the arrangement of panels in the courses specifically shown may be made, without departing from the spirit of the invention as defined in the following claims.

I claim:

1. In a form for plastic structural work, a plurality of vertical brace members in spaced relation; a plurality of rectangular mold panels, each comprising a rectangular frame including vertically spaced horizontal wales and horizontally spaced vertical stiles, and a panel proper carried by said frame for confining the plastic material in the mold cavity, said mold panels arranged in several superposed contacting courses with joints staggered, and the stiles of the mold panels of alternate courses confronting the said vertical brace members and the wales of the mold panels of said alternate courses provided with end vertical holes adjacent their respective stiles, and the panels of the other alternate courses of panels having intermediate vertical holes in their wales aligning with the said end holes of said first mentioned courses; and clamps for coupling the mold panels of the courses together and to said vertical brace members, each clamp including a body portion embracing its respective brace member and two pins rigid with said body portion and extending into the aligned end and intermediate holes of the wales of superjacent contacting mold panels to keep the panels from separating endwise and to secure the panels to the said brace members.

2. In a form for plastic structural work, a vertical brace member; a pair of mold panels in end to end relation adjacent one face of said brace member, each panel including a horizontal wale terminating adjacent said brace member, said wales disposed in the same horizontal plane and each provided with a vertical hole adjacent its terminal end; a clamp for coupling said panels together and to said vertical brace member, said clamp comprising a U-shaped body portion disposed with its bight portion at the face of said brace member opposite said mold panels and its arms extending from said bight to each side of said brace member and above said wales, and a downwardly extending pin on each of said arms, said pins extending into said holes of the wales; and a spanner for said arms of the clamp disposed between said mold panels and said vertical brace member and engaging the opposite outer faces of said arms.

JAMES W. HART.

REFERENCES CITED

The following references are of record in the file of this patent:

UNITED STATES PATENTS

| Number | Name | Date |
|---|---|---|
| 62,676 | Park | Mar. 5, 1867 |
| 828,031 | Kemper | Aug. 7, 1906 |
| 906,493 | Guthrie | Dec. 8, 1908 |
| 1,137,998 | Merriett | May 4, 1915 |
| 1,472,642 | Evans, Jr. | Oct. 30, 1923 |
| 1,779,908 | Graziano | Oct. 28, 1930 |
| 1,970,547 | Anderson | Aug. 21, 1934 |
| 2,017,553 | Troiel | Oct. 15, 1935 |
| 2,236,616 | Bosco | Apr. 1, 1941 |
| 2,341,993 | Jennings | Feb. 15, 1944 |